United States Patent
Adi et al.

(10) Patent No.: US 10,929,767 B2
(45) Date of Patent: Feb. 23, 2021

(54) METHOD FOR COMPLEX EVENTS DETECTION USING HIDDEN MARKOV MODELS

(71) Applicant: International Business Machines Corporation, Armonk, NY (US)

(72) Inventors: Asaf Adi, Qiryat Ata (IL); Lior Limonad, Nesher (IL); Nir Mashkif, Ein Carmel (IL); Segev E Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 15/163,701

(22) Filed: May 25, 2016

(65) Prior Publication Data
US 2017/0344893 A1    Nov. 30, 2017

(51) Int. Cl.
G06N 7/00    (2006.01)

(52) U.S. Cl.
CPC .................. *G06N 7/005* (2013.01)

(58) Field of Classification Search
CPC ............... G06N 7/005; G06N 7/023
See application file for complete search history.

(56) References Cited

U.S. PATENT DOCUMENTS

| | | | |
|---|---|---|---|
| 6,434,522 B1* | 8/2002 | Tsuboka | G10L 15/144 704/222 |
| 2007/0041615 A1* | 2/2007 | Chan | G06K 9/00771 382/107 |
| 2010/0317420 A1* | 12/2010 | Hoffberg | G06Q 30/0207 463/1 |
| 2014/0050354 A1 | 2/2014 | Heim et al. | |

(Continued)

FOREIGN PATENT DOCUMENTS

WO    2015009781    1/2015

OTHER PUBLICATIONS

Yuri Grinberg, State sequence analysis in hidden Markov models, Jul. 12, 2015, AUAI Press, UAI'15 Proceedings of the Thirty-First Conference on Uncertainty in Artificial Intelligence pp. 336-344.*

(Continued)

*Primary Examiner* — Daniel T Pellett
(74) *Attorney, Agent, or Firm* — Gregory J. Kirsch

(57) ABSTRACT

Embodiments of the present invention may provide the capability to detect complex events while providing improved detection and performance. In an embodiment of the present invention, a method for detecting an event may comprise receiving data representing measurement or detection of physical parameters, conditions, or actions, quantizing the received data and selecting a number of samples from the quantized data, generating a hidden Markov model representing events to be detected using initial model values based on ideal conditions, wherein a desired output is (Continued)

defined as a sequence of states, and wherein a number of states of the hidden Markov model is less than or equal to the number of samples of the quantized data, adjusting the quantized data and the initial model values to improve accuracy of the model, determining a state sequence of the hidden Markov model, and outputting an indication of a detected event.

18 Claims, 6 Drawing Sheets

(56) References Cited

U.S. PATENT DOCUMENTS

| | | | | |
|---|---|---|---|---|
| 2014/0229410 A1* | 8/2014 | Jallon | ...................... | G06N 7/00 706/12 |
| 2016/0120432 A1* | 5/2016 | Sridhar | ................ | A61B 5/6898 600/544 |
| 2016/0155062 A1* | 6/2016 | Fisher | .................... | G06N 20/00 706/12 |
| 2017/0265755 A1* | 9/2017 | Becerik-Gerber | ........................... | A61B 5/02007 |

OTHER PUBLICATIONS

Satyam Jeebun, Optimal Number of States in Hidden Markov Models and its Application to the Detection of Human Movement, Aug. 13 2015, University of Mauritius Research Journal—vol. 21.*

Yuri Grinberg, State sequence analysis in hidden Markov models, Jul. 12, 2015, AUAI Press, UAI'15 Proceedings of the Thirty-First Conference on Uncertainty in Artificial Intelligence, pp. 336-344 (Year: 2015).*

Mou-Yen Chen, "Off-Line Handwritten Word Recognition Using a Hidden Markov Model Type Stochastic Network", 1994, IEEE (Year: 1994).*

Huiyue Wu., "Combining hidden Markov model and fuzzy network for continuous recognition of complex dynamic gestures", Original Article, The Visual Computer, pp. 1-14.

* cited by examiner

|  | $S_0$ | $S_1$ | $S_2$ | $S_3$ |
|---|---|---|---|---|
| $S_0$ | 0.5 | 0.5 |  |  |
| $S_1$ |  | 0.5 | 0.5 |  |
| $S_2$ |  |  | 0.5 | 0.5 |
| $S_3$ |  |  |  | 1 |

304

|  | $E_0$ | $E_1$ | $E_2$ | $E_3$ |
|---|---|---|---|---|
| $S_0$ | 1 |  |  |  |
| $S_1$ |  | 1 |  |  |
| $S_2$ |  |  | 1 |  |
| $S_3$ |  |  |  | 1 |

|  | $S_0$ | $S_1$ | $S_2$ | $S_3$ |
|---|---|---|---|---|
| $S_0$ | 0.1 | 0.9 |  |  |
| $S_1$ |  | 0.3 | 0.7 |  |
| $S_2$ |  |  | 0.4 | 0.6 |
| $S_3$ |  |  |  | 1 |

404

|  | $E_0$ | $E_1$ | $E_2$ | $E_3$ |
|---|---|---|---|---|
| $S_0$ | 1 |  |  |  |
| $S_1$ |  | 0.3 | 0.7 |  |
| $S_2$ |  | 0.1 | 0.8 | 0.1 |
| $S_3$ |  |  | 0.5 | 0.5 |

METHOD FOR COMPLEX EVENTS DETECTION USING HIDDEN MARKOV MODELS

BACKGROUND

The present invention relates to techniques for detecting complex events using hidden Markov models.

Event processing is a technique for processing streams of information about events that occur, and deriving conclusions from the data. Complex event processing is event processing that combines data from multiple sources to derive events or patterns in the data so as to detect more complicated events or patterns. The goal of complex event processing is to identify meaningful events to be able to respond to them in a timely manner. For example, complex event processing may target detection of events that consist of smaller events. In certain sequences these smaller events may constitute a complex event, which is of interest and is to be detected. Examples of complex event detection may be detection of fatigue and stress, gesture recognition, recognition of certain actions consisting of numerous movements, etc. Such event detection using available data, such as sensor readings is of great interest. Existing methods of detection are rule based and thus, limited.

Accordingly, a need arises for techniques by which complex events may be detected that provides improved detection and performance.

SUMMARY

Embodiments of the present invention may provide the capability to detect complex events while providing improved detection and performance. Such techniques may include detecting complex events using hidden Markov models (HMM).

In an embodiment of the present invention, a method for detecting an event may comprise receiving data representing measurement or detection of physical parameters, conditions, or actions, quantizing the received data and selecting a number of samples from the quantized data, generating an HMM representing events to be detected using, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model, adjusting the quantized data and the initial model values to improve accuracy of the model, determining a state sequence of the HMM, and outputting an indication of a detected event.

The initial model values may be determined for a transition probability matrix and an emissions matrix of the HMM. The initial model values may be adjusted by adjusting values of the transition probability matrix and the emissions probability matrix. The values of the transition probability matrix and the emissions probability matrix may be adjusted using a Baum-Welch algorithm. The state sequence of the HMM may be determined by determining a most likely sequence of states. The most likely sequence of states may be determined using a Viterbi algorithm. The defined sequence of states may comprise both a sequence of distinct states and states including repetitions. The number of states of the HMM may be less than the number of samples of the quantized data. The model may be generated so as to be fully observable.

In an embodiment of the present invention, an apparatus for detecting an event may comprise circuitry adapted to receive data representing measurement or detection of physical parameters, conditions, or actions, circuitry adapted to quantize the received data and selecting a number of samples from the quantized data, circuitry adapted to generate a HMM representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model, circuitry adapted to adjust the quantized data and the initial model values to improve accuracy of the model, circuitry adapted to determine a state sequence of the HMM, and circuitry adapted to output an indication of a detected event.

In an embodiment of the present invention, a computer program product for detecting an event, the computer program product may comprise a non-transitory computer readable storage having program instructions embodied therewith, the program instructions executable by a computer, to cause the computer to perform a method comprising receiving data representing measurement or detection of physical parameters, conditions, or actions, quantizing the received data and selecting a number of samples from the quantized data, generating HMM representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model, adjusting the quantized data and the initial model values to improve accuracy of the model, determining a state sequence of the HMM, and outputting an indication of a detected event.

In an embodiment of the present invention, a system for detecting an event, the system may comprise a processor, memory accessible by the processor, and computer program instructions stored in the memory and executable by the processor to perform receiving data representing measurement or detection of physical parameters, conditions, or actions, quantizing the received data and selecting a number of samples from the quantized data, generating a HMM representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model, adjusting the quantized data and the initial model values to improve accuracy of the model, determining a state sequence of the HMM, and outputting an indication of a detected event.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary diagram of a HMM that may be determined using embodiments of the present invention.

FIG. 4 is an exemplary diagram of a HMM that may be determined using embodiments of the present invention.

DETAILED DESCRIPTION

Embodiments of the present invention may provide the capability to detect complex events while providing improved detection and performance. Such techniques may include detecting complex events using hidden Markov models. For example, statistical models and domain knowledge may be leveraged so that, using the domain knowledge and assuming ideal conditions, a model for complex events identification may be defined. Then, using statistics of disturbances and the ideal model, a sequence of most likely events may be detected. This sequence may correspond to a complex event or events. To solve the problem Hidden Markov Models (HMM) may be used.

Embodiments of the present invention may provide the capability to perform complex event processing, such as gesture recognition, detecting levels of fatigue/stress, etc. by adjusting data of real world conditions in accordance with ideal world conditions/assumptions made over observations using domain knowledge and sensor data, such as accelerometer & gyroscope data. Embodiments may use Hidden Markov Models (HMM) defining gestures as a sequence of states and calculating transition and emission probabilities under ideal conditions. Likewise, embodiments may use_ Baum-Welch algorithms for adjusting sensor data, transition probabilities, and emission probability matrices to real world conditions, while clustering may be used for quantization of data.

Figure 1:
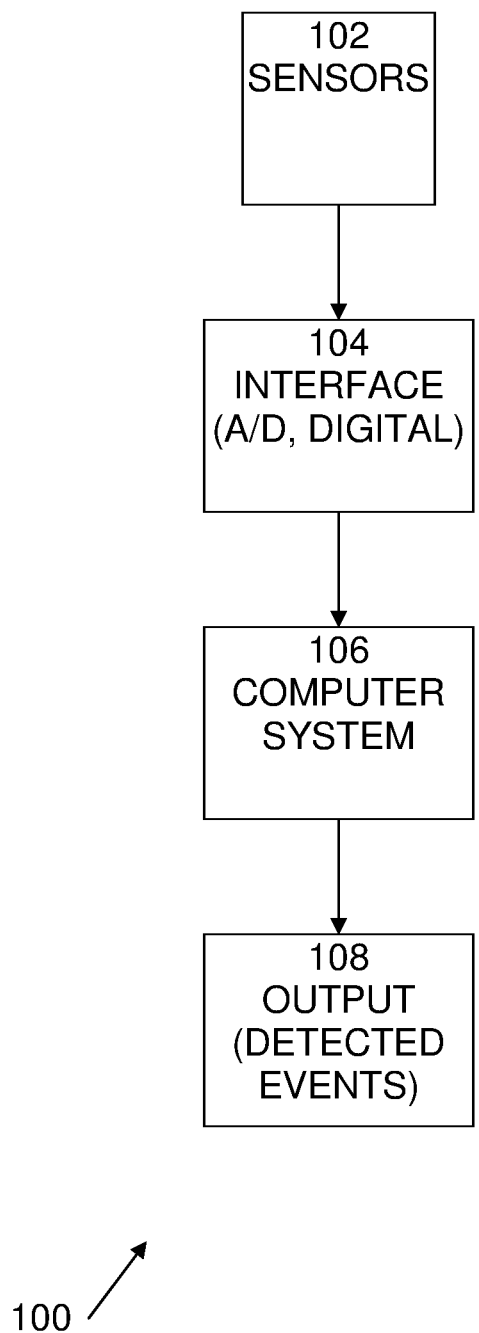
FIG. 1 is an exemplary block diagram of a system in which techniques of the present invention may be implemented.

An example of a system 100 in which techniques of the present invention may be implemented is shown in FIG. 1. In the example shown in FIG. 1, system 100 may include one or more sensors 102, interface circuitry 104, computer system 106, and output 108. Sensors 102 may include devices or apparatus for measuring or detecting physical parameters, conditions, or actions. Interface circuitry 104 may include circuitry for receiving the measurements or detections from sensors 102, converting the measurements or detections into data signals that may be processed by computer system 106, and transmitting the data signals to computer system 106. For example, analog signals measured by sensors 102 may be converted to digital data streams. Likewise, digital data streams received from suitably configured sensors or other devices may be converted and transmitted, or directly transmitted to computer system 106. Computer system 106 may be any general or special purpose computer system that may analyze the data and generate output 108. In some embodiments, computer system 106 may be partially or completely replaced by special-purpose hardware implementations. Output 108 may include any representation of a detected event. Such output may include text, numbers, images, audio, video, etc., and signals to activate other devices or equipment.

Figure 2:
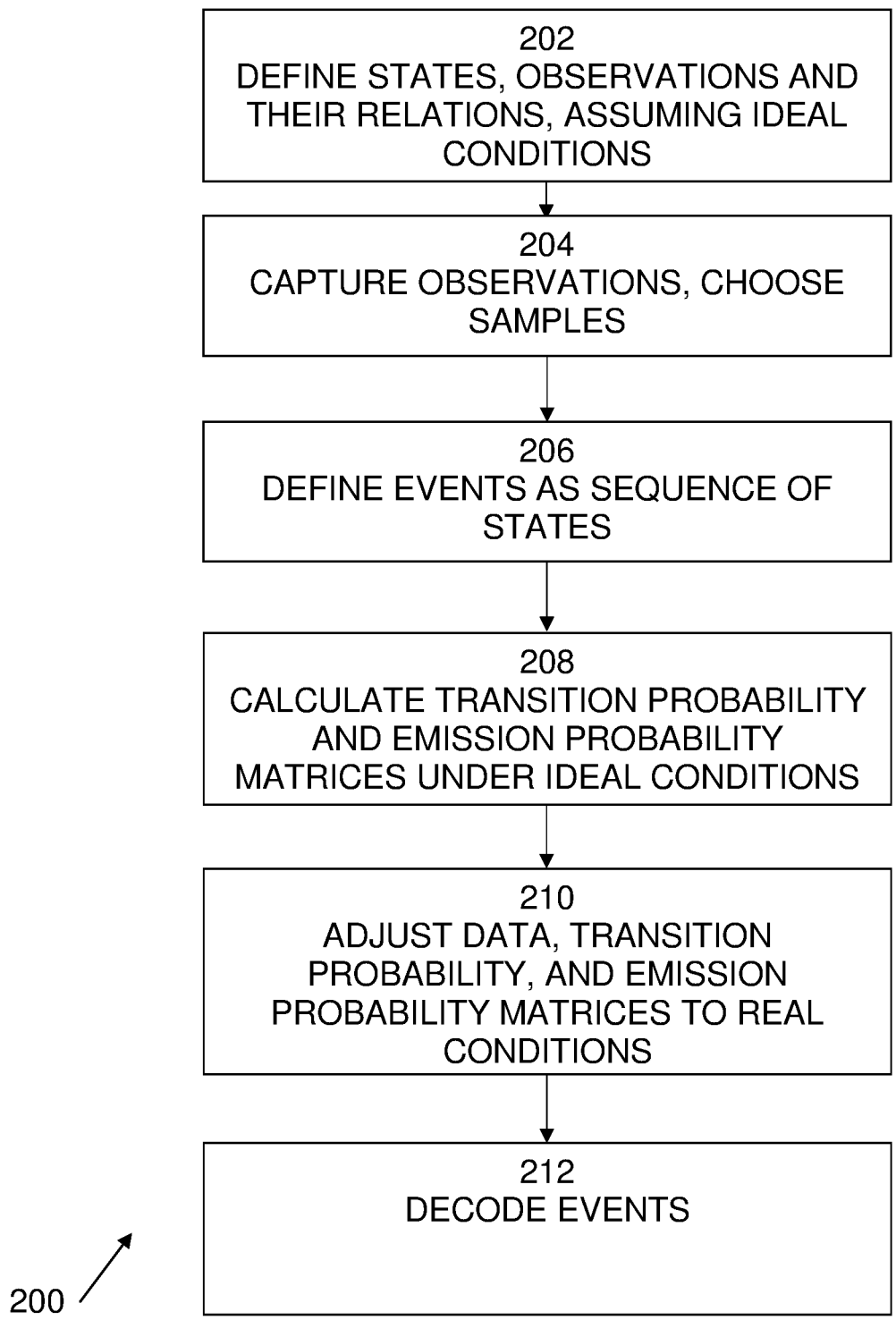
FIG. 2 is an exemplary flow diagram for a HMM based method for complex event detection that may be implemented in the environment shown in FIG. 1.

An example of a process 200 for a HMM based method for complex event detection that may be implemented in the environment shown in FIG. 1 is shown in FIG. 2. Process 200 may begin with 202, in which states, observations, and their relations may be defined. The relations may be defined assuming ideal conditions, such as, for gesture recognition, a person performing gestures may be assumed to perform each gesture identically and at constant speed of movement each time the gesture is performed. In 204, observations, such as accelerometer and gyroscope data, are captured, using hardware such as that shown in FIG. 1. For example, the accelerometer and gyroscope data may be quantized and data samples may be chosen from the quantized data. The data samples may be uniformly chosen and the number of data samples chosen may be equal to the number of observations assigned to each gesture. Each observation, represented by a data sample, may correspond to one or more states. For example, if the number of observations equals the number of states, then each observation may correspond to one state, which may be useful, for example, for gesture recognition. In this case, the Markov model may provide full observability (ideal conditions assumptions may help) Likewise, if the number of observations is greater than the number of states, then one or more observation may correspond to one state. However, even in these cases, it is possible that not all states may have corresponding observations.

Examples of possible states and observations that may be used may include:

Stress—the states may include various stress levels, while the observations may include an approximate entropy based on physiological measurements such as electrocardiogram (ECG) readings, heart rate variability (HRV) readings, galvanic skin response (GSR) readings, and other physiological measurements.

Fatigue—the states may include various fatigue levels, while the observations may include physiological measurements such as spectral ratios, (low frequency/high frequency ratios) of ECG/HRV readings, sleep quality, acceleration of movements, electroencephalogram (EEG) readings, response time, precision of movements, etc.

Heat Stress—the states may include various heat stress levels, while the observations may include physiological measurements such as skin temperature based fitness band readings, core body temperature based on wireless, swallowable, internal temperature sensors, heart rate, etc.

Overexertion—the states may include various overexertion levels, while the observations may include physiological measurements such as heart rate readings, etc.

Gesture—the states may include various acceleration and/or rotation speed intervals, while the observations may include physical measurements such as x, y, z (quantized) acceleration based on accelerometer readings, etc.

In 206, the desired event or events may be defined as a sequence of states. For example, each gesture may be defined as a particular sequence of states. One or more such gestures may be defined as a sequence of either distinct states or states with repetitions.

In 208, transition probabilities and emissions probability matrices may be calculated assuming ideal conditions. The initial estimation for transition probabilities and emissions probability matrices may be done using real data, simulations, intuition, etc.

In 210, the quantized data, transition probability matrices, and emissions probability matrices may be adjusted to improve the accuracy of the model. For example, clustering may be used to quantize the data or to adjust the quantized data, or the Baum-Welch algorithm may be used to adjust the transition probability matrices and emissions probability matrices. Due to local optimality, the initial conditions may be important.

At 212, the adjusted quantized data, transition probabilities, and emissions probability matrices may then be used as a finished model to decode a sequence of events in order to detect instances or occurrences of events, such as gestures. For example, for any given transition probability matrix, emission probability matrix, and sequence of observations, the Viterbi Algorithm (VA) may be used to determine the most likely sequence of states that produced the sequence of observations. Typically, the most likely path may be used to determine the occurrence of an event, but paths other than the most likely path may also, or alternatively, be used. However, the Viterbi Algorithm will always return the most likely event as detected even if no event actually happened. Accordingly, an additional check, or decoding, may be performed to determine whether the event detected by the Viterbi Algorithm actually occurred. For example, an event, such as a gesture, is considered possible if a path (sequence of states) ends up at a predefined state. For example, referring briefly to FIG. 5, in the exemplary left-to-right HMM depicted, this means that all states before the predefined state were visited as well. The decoder may check the path returned by the Viterbi Algorithm to determine whether that path ended at a predefined state. If so, the event may be indicated as detected. If not, it may be indicated that no event was detected.

An exemplary transition probability matrix 302 and an exemplary emission probability matrix 304 are shown in FIG. 3. For this example, S is a state space and E is an observation space. Transition probability matrix 302 and emission probability matrix 304 are examples of initial matrix definitions, which were defined based on ideal assumptions, such as in 208 above. In a transition probability matrix, each entry in the matrix is a mapping $P:s_i \times s_j \rightarrow [0,1]$, when $s_i, s_j \in S$. For example, in transition probability matrix 302, the probability to move to state $s_1$ when at state so is 0.5. Likewise, each entry in an emission probability matrix is a mapping $P:s_i \times e_j \rightarrow [0,1]$, when $s_i \in S$, $e_j \in E$.

Figure 5:
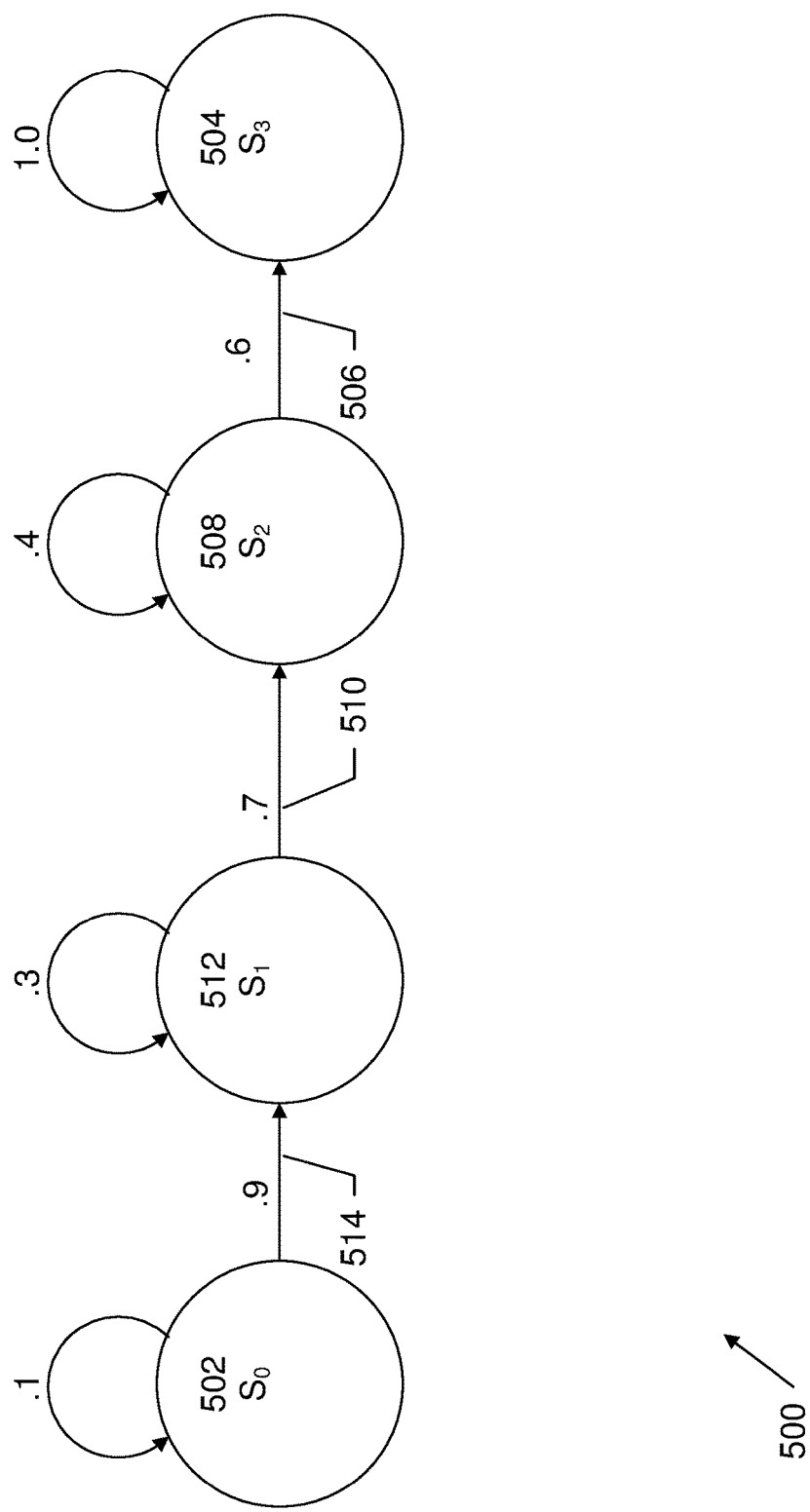
FIG. 5 is an exemplary flow diagram of a process using clustering.

In order to adjust the transition probability matrix and the emission probability matrix, such as in 210, a process such as the Baum-Welch (BW) algorithm may be used. This algorithm is local optimal. For local optimal algorithms, the initialization is frequently important. For example, after BW is applied, the transition and emission probability matrices may be adjusted as shown in the FIG. 4. The initial matrix conditions are as defined in FIG. 3, and are adjusted to form the transition probability matrix 402 and the emission probability matrix 404 shown in FIG. 4. A state diagram of transition probability matrix 402 is shown in FIG. 5.

Clustering or cluster analysis is a technique which may be used for quantization. For example, data samples may be uniformly chosen for initialization (every $10^{th}$ out of the 100) with the number of samples equal to the number of observations assigned to each gesture. Each of the samples may then be assigned to one of the clusters based on each sample's distance from the center of each cluster. When initialization for quantization is successful it can reduce dramatically the number of iterations required during the training stage.

Figure 6:
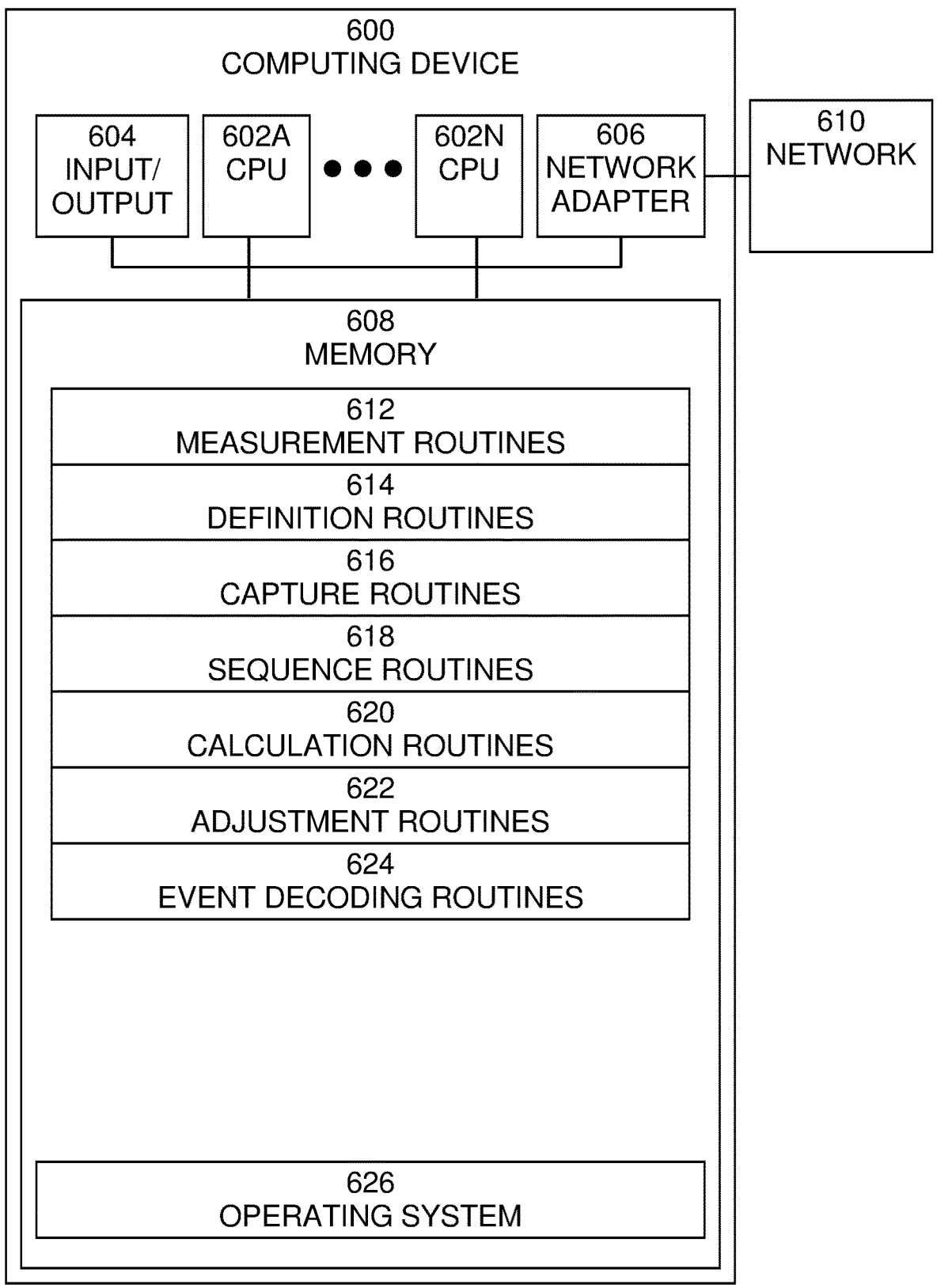
FIG. 6 is an exemplary block diagram of a computer system in which processes involved in the embodiments described herein may be implemented.

An exemplary block diagram of a computer system 600, in which processes involved in the embodiments described herein may be implemented, is shown in FIG. 6. Computer system 600 is typically a programmed general-purpose computer system, such as an embedded processor, system on a chip, personal computer, workstation, server system, and minicomputer or mainframe computer. Computer system 600 may include one or more processors (CPUs) 602A-602N, input/output circuitry 604, network adapter 606, and memory 608. CPUs 602A-602N execute program instructions in order to carry out the functions of the present invention. Typically, CPUs 602A-602N are one or more microprocessors, such as an INTEL PENTIUM® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present invention also contemplates embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 6, memory 608 may include measurement routines 612, definition routines 614, capture routines 616, sequence routines 618, calculation routines 620, adjustment routines 622, event decoding routines 624, and operating system 626. For example, measurement routines 612 may include routines to operate sensors and interface circuitry so as to perform measurement or detection of physical parameters, conditions, or actions and to obtain data representing those measurements or detections. Definition routines 614 may include routines to define states, observations and their relations, assuming ideal conditions. Capture routines 616 may include routines to capture and quantize sensor data, and to choose data samples from the quantized data. Sequence routines 618 may include routines to define events as a sequence of states. Calculation routines 620 may include routines to calculate transition probabilities and emissions matrices assuming ideal conditions. Adjustment routines 622 may include routines to adjust the quantized data, transition probabilities, and emissions matrices to improve the accuracy of the model. Event decoding routines 624 may include routines to decode a sequence of events to detect a most likely sequence of events or sequence of states and to determine whether the detected event actually occurred. Operating system 626 provides overall system functionality.

As shown in FIG. 6, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for detecting an event comprising:
    measuring or detecting physical parameters, conditions, or actions using at least one sensor;
    converting the measured or detected physical parameters, conditions, or actions into data signals;
    quantizing the data signals to form quantized data and selecting a number of samples from the quantized data;
    generating a hidden Markov model representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model;
    adjusting the quantized data and the initial model values to improve accuracy of the model;
    detecting an event based on a state sequence of the hidden Markov model, wherein the state sequence of the hidden Markov model is determined by determining a most likely sequence of states using a Viterbi method, the most likely sequence of states determined by the Viterbi method is checked to determine whether the sequence of states ends at a predetermined state, an event is indicated as detected when the sequence of states ends at a predetermined state, and no event is indicated as detected when the sequence of states does not end at the predetermined state; and
    outputting an indication of the detected event;
    wherein
    the detected physical parameters, conditions, or actions include physiological measurements and the states of the hidden Markov model correspond to a plurality of stress levels, a plurality of fatigue levels, a plurality of heat stress levels, and a plurality of overexertion levels;
    the detected physical parameters, conditions, or actions include physical measurements and the states of the hidden Markov model correspond to a plurality of acceleration speed levels and a plurality of rotation speed levels; and
    the values of the quantized data from the sensors, the transition probability matrix, and the emissions matrix are adjusted to real world conditions using a Baum-Welch method.

2. The method of claim 1, wherein the initial model values are determined for a transition probability matrix and an emissions matrix of the hidden Markov model and the initial model values are adjusted by adjusting values of the transition probability matrix and the emissions matrix.

3. The method of claim 2, wherein the defined sequence of states comprises a sequence of distinct states and the most likely sequence of states is determined by ignoring state repetitions.

4. The method of claim 2, wherein the quantized data is adjusted using clustering.

5. The method of claim 1, wherein the number of states of the hidden Markov model is less than the number of samples of the quantized data.

6. The method of claim 1, wherein the model is generated so as to be fully observable.

7. A computer program product for detecting an event, the computer program product comprising a non-transitory computer readable storage having program instructions embodied therewith, the program instructions executable by a computer, to cause the computer to perform a method comprising:
    measuring or detecting physical parameters, conditions, or actions using at least one sensor;
    converting the measured or detected physical parameters, conditions, or actions into data signals;
    quantizing the data signals to form quantized data and selecting a number of samples from the quantized data;
    generating a hidden Markov model representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in the model;
    adjusting the quantized data and the initial model values to improve accuracy of the model;

detecting an event based on a state sequence of the hidden Markov model, wherein the state sequence of the hidden Markov model is determined by determining a most likely sequence of states using a Viterbi method, the most likely sequence of states determined by the Viterbi method is checked to determine whether the sequence of states ends at a predetermined state, an event is indicated as detected when the sequence of states ends at a predetermined state, and no event is indicated as detected when the sequence of states does not end at the predetermined state; and outputting an indication of the detected event;

wherein the detected physical parameters, conditions, or actions include physiological measurements and the states of the hidden Markov model correspond to a plurality of stress levels, a plurality of fatigue levels, a plurality of heat stress levels, and a plurality of overexertion levels;

the detected physical parameters, conditions, or actions include physical measurements and the states of the hidden Markov model correspond to a plurality of acceleration speed levels and a plurality of rotation speed levels; and the values of the quantized data from the sensors, the transition probability matrix, and the emissions matrix are adjusted to real world conditions using a Baum-Welch method.

8. The computer program product of claim 7, wherein the initial model values are determined for a transition probability matrix and an emissions matrix of the hidden Markov model and the initial model values are adjusted by adjusting values of the transition probability matrix and the emissions matrix.

9. The computer program product of claim 8, wherein the defined sequence of states comprises a sequence of distinct states and the most likely sequence of states is determined by ignoring state repetitions.

10. The computer program product of claim 8, wherein the quantized data is adjusted using clustering.

11. The computer program product of claim 7, wherein the number of states of the hidden Markov model is less than the number of samples of the quantized data.

12. The computer program product of claim 7, wherein the model is generated so as to be fully observable.

13. A system for detecting an event, the system comprising:

at least one sensor adapted to measure or detect physical parameters, conditions, or actions;

a converter adapted to convert the measured or detected physical parameters, conditions, or actions into data signals;

a quantizer adapted to quantize the data signals to form quantized data; and a processor, memory accessible by the processor, and computer program instructions stored in the memory and executable by the processor to perform:

selecting a number of samples from the quantized data;

generating a hidden Markov model representing events to be detected, wherein a desired event is represented by a sequence of states, wherein a number of states of the hidden Markov model is less than or equal to the number of samples of the quantized data, and wherein the model is generated using initial model values, states, and connections based on ideal conditions so as to reduce the impact of uncertainty in state identification in of the model;

adjusting the quantized data and the initial model values to improve accuracy of the model;

detecting an event based on a state sequence of the hidden Markov model, wherein the state sequence of the hidden Markov model is determined by determining a most likely sequence of states using a Viterbi method, the most likely sequence of states determined by the Viterbi method is checked to determine whether the sequence of states ends at a predetermined state, an event is indicated as detected when the sequence of states ends at a predetermined state, and no event is indicated as detected when the sequence of states does not end at the predetermined state; and outputting an indication of the detected event;

wherein the detected physical parameters, conditions, or actions include physiological measurements and the states of the hidden Markov model correspond to a plurality of stress levels, a plurality of fatigue levels, a plurality of heat stress levels, and a plurality of overexertion levels;

the detected physical parameters, conditions, or actions include physical measurements and the states of the hidden Markov model correspond to a plurality of acceleration speed levels and a plurality of rotation speed levels; and the values of the quantized data from the sensors, the transition probability matrix, and the emissions matrix are adjusted to real world conditions using a Baum-Welch method.

14. The system of claim 13, wherein the initial model values are determined for a transition probability matrix and an emissions matrix of the hidden Markov model and the initial model values are adjusted by adjusting values of the transition probability matrix and the emissions matrix.

15. The system of claim 14, wherein the defined sequence of states comprises a sequence of distinct states and the most likely sequence of states is determined by ignoring state repetitions.

16. The system of claim 14, wherein the quantized data is adjusted using clustering.

17. The system of claim 13, wherein the number of states of the hidden Markov model is less than the number of samples of the quantized data.

18. The system of claim 13, wherein the model is generated so as to be fully observable.

* * * * *